(12) United States Patent
Chino et al.

(10) Patent No.: US 11,718,344 B2
(45) Date of Patent: *Aug. 8, 2023

(54) VEHICLE BODY REAR PART STRUCTURE

(71) Applicant: HONDA MOTOR CO., LTD., Tokyo (JP)

(72) Inventors: Shungo Chino, Tokyo (JP); Yuya Akaba, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,838

(22) Filed: Feb. 17, 2022

(65) Prior Publication Data

US 2022/0281527 A1 Sep. 8, 2022

(30) Foreign Application Priority Data

Mar. 4, 2021 (JP) .................................. 2021-034622

(51) Int. Cl.
*B62D 21/11* (2006.01)
(52) U.S. Cl.
CPC .................................. *B62D 21/11* (2013.01)
(58) Field of Classification Search
CPC ................. B62D 21/11; B62D 21/157; B62D 25/2027; B62D 25/2036; B60G 7/008; B60G 2200/132
See application file for complete search history.

(56) References Cited

U.S. PATENT DOCUMENTS

| 9,156,501 B2* | 10/2015 | Mildner | B62D 25/088 |
| 9,156,504 B2* | 10/2015 | Terada | B60G 3/20 |
| 2009/0146455 A1 | 6/2009 | Honji et al. | |
| 2013/0161978 A1 | 6/2013 | Herntier et al. | |

(Continued)

FOREIGN PATENT DOCUMENTS

| CN | 101450685 | 6/2009 |
| CN | 110171477 | 8/2019 |

(Continued)

OTHER PUBLICATIONS

Japanese Notice of Allowance for Japanese Patent Application No. 2021-034622 dated Oct. 4, 2022.

(Continued)

*Primary Examiner* — Laura Freedman
(74) *Attorney, Agent, or Firm* — Amin, Turocy & Watson, LLP

(57) ABSTRACT

A vehicle body rear part includes a side sill, a rear side frame, a cross member, a trailing arm, an arm attachment bracket, and a close plate. In the trailing arm, a front end part is swingably supported via a mount member at a front region of the rear side frame. The arm attachment bracket is fixed into a cross section of the rear side frame and has a fixation nut with which the mount member is fastened and fixed. The bracket reinforcement member reinforces the arm attachment bracket. The close plate closes an opening on an upper side of the front region of the rear side frame. End parts on both sides in the vehicle width direction of the bracket reinforcement member are joined to the side sill and the cross member, and an upper part of the bracket reinforcement member is joined to the close plate.

4 Claims, 11 Drawing Sheets

(56) References Cited

U.S. PATENT DOCUMENTS

2022/0281529 A1* 9/2022 Chino .................... B62D 25/16
2022/0281533 A1* 9/2022 Chino .................. B62D 25/088

FOREIGN PATENT DOCUMENTS

| DE | 19744664 | | 6/1998 |
| JP | 4478662 | | 6/2010 |
| JP | 2010132026 A | * | 6/2010 |
| JP | 2012076703 A | * | 4/2012 |
| JP | 5426614 | | 2/2014 |
| JP | 2014113909 A | * | 6/2014 |
| JP | 2016107848 A | * | 6/2016 |
| JP | 2017-136869 | | 8/2017 |
| JP | 2017-210141 | | 11/2017 |
| JP | 2018-203044 | | 12/2018 |
| JP | 2018-203055 | | 12/2018 |

OTHER PUBLICATIONS

Japanese Notice of Allowance for Japanese Patent Application No. 2021-034596 dated Oct. 4, 2022.
Chinese Notice of Allowance for Chinese Patent Application No. 202210116775.X dated May 31, 2023.

* cited by examiner

VEHICLE BODY REAR PART STRUCTURE

CROSS-REFERENCE TO RELATED APPLICATION

Priority is claimed on Japanese Patent Application No. 2021-034622, filed on Mar. 4, 2021, the contents of which are incorporated herein by reference.

BACKGROUND

Field of the Invention

The present invention relates to a vehicle body rear part structure that includes a trailing arm for a rear wheel suspension.

Background

In a vehicle that includes a trailing arm type rear wheel suspension apparatus, an arm insertion hole is provided on a lower wall of a front region of a rear side frame, and a front end side of a trailing arm that supports a rear wheel at a rear part is inserted through the arm insertion hole. A front end part of the trailing arm is swingably supported in a cross section of the front region of the rear side frame via a mount member that includes a rubber elastic body. The front region of the rear side frame is joined to an inner side in a vehicle width direction of a side sill disposed below a side part of a passenger compartment (for example, refer to Japanese Patent No. 4478662).

In the vehicle body rear part structure described in Japanese Patent No. 4478662, an arm attachment bracket having a dome-shaped part that opens downward is fixed into the cross section of the front region of the rear side frame. Fixation nuts are provided on right and left side portions of the dome-shaped part of the arm attachment bracket, and a shaft part of a mount member is fastened to right and left fixation nuts by a bolt. An upper side of the mount member is covered by the dome-shaped part in this state. A reinforcement member that is connected to right and left side walls of a rear side frame is disposed above the arm attachment bracket in the cross section of the front region of the rear side frame, and upper parts of the right and left fixation nuts are supported by the reinforcement member. Further, the front region of the rear side frame is joined to an inner part of the side sill in the vehicle width direction. Right and left side sills of the vehicle body are connected to each other by a cross member that extends in the vehicle width direction at a vehicle frontward side further than a support part of the mount member of the rear side frame.

SUMMARY

In the vehicle body rear part structure described in Japanese Patent No. 4478662, the arm attachment bracket and a bracket support member are fixed into the cross section of the front region of the rear side frame, and the mount member on a front end side of the trailing arm is supported by the cross section of the front region of the rear side frame via the arm attachment bracket and the bracket support member.

A large load in the vehicle width direction and a vehicle forward/rearward direction is applied to the trailing arm at the time of rapid turning of the vehicle or the like, and a large stress in the vehicle width direction and the vehicle forward/rearward direction acts on a support part of the mount member of the trailing arm. In the vehicle body rear part structure described in Japanese Patent No. 4478662, it is desired to be able to further strongly support the stress that acts on the support part of the mount member of the trailing arm at the time of rapid turning of the vehicle or the like.

An aspect of the present invention provides a vehicle body rear part structure capable of sufficiently supporting a stress in a vehicle width direction and a vehicle forward/rearward direction that is applied to a trailing arm at the time of rapid turning of the vehicle or the like.

A vehicle body rear part structure according to an aspect of the present invention includes: a side sill that is disposed below a side part of a passenger compartment substantially in a vehicle forward/rearward direction; a rear side frame which has a front region that is joined to an inside in a vehicle width direction of a rear part of the side sill and in which an arm insertion hole is provided on a lower wall of the front region; a cross member that extends substantially in the vehicle width direction and that has an outer end part in the vehicle width direction which is connected to the front region of the rear side frame; a trailing arm which has a rear side that supports a rear wheel and in which a front end part that is inserted through the arm insertion hole of the rear side frame is swingably supported via a mount member at the front region of the rear side frame; an arm attachment bracket that is fixed into a cross section having a substantially C shape which opens to an upper side of the front region of the rear side frame and that has a fixation nut with which the mount member is fastened and fixed; a bracket reinforcement member that is attached to the arm attachment bracket and that reinforces the arm attachment bracket; and a close plate that is fixed to an upper part of the front region of the rear side frame and that closes an opening on an upper side of the front region, wherein end parts on both sides in the vehicle width direction of the bracket reinforcement member are directly or indirectly joined to the side sill and the cross member, and an upper part of the bracket reinforcement member is joined to the close plate.

In the above-described configuration, when a stress in the vehicle width direction is applied to the trailing arm at the time of rapid turning of the vehicle or the like, the stress is supported by the fixation nut of the arm attachment bracket that fastens and fixes the mount member, the cross member, and the side sill via the bracket reinforcement member. When a stress in the vehicle forward/rearward direction is applied to the trailing arm at the time of rapid turning of the vehicle or the like, the stress is supported by the fixation nut of the arm attachment bracket that fastens and fixes the mount member and the close plate via the bracket reinforcement member.

The bracket reinforcement member may be a plate member having a substantially L-shaped cross section and having: a vertical stand wall that extends in the vehicle width direction and vertical direction; and an upper end bend flange that extends to be bent in the vehicle forward/rearward direction from an upper end part of the vertical stand wall, a penetration hole may be provided on the close plate, and a circumference edge part of the penetration hole of the close plate may be joined to the upper end bend flange via a weld material.

In this case, through the penetration hole of the close plate, it becomes possible to easily weld and fix the upper end bend flange and the circumference edge part of the penetration hole. Accordingly, it is possible to strongly fix the close plate and the upper end bend flange of the bracket reinforcement member and to sufficiently support the stress in the vehicle forward/rearward direction applied to the trailing arm by the close plate.

The arm attachment bracket may include a dome-shaped part that covers an upper side of the mount member, the vertical stand wall may include a recess part that is fitted to an outer surface of the dome-shaped part, and a lower side bend flange that is joined to the outer surface of the dome-shaped part may be formed on an edge portion of the recess part.

In this case, a stress applied to the arm attachment bracket from the mount member is efficiently transmitted to the bracket reinforcement member through the dome-shaped part of the arm attachment bracket, the lower side bend flange and the recess part of the bracket reinforcement member. Therefore, it is possible to sufficiently support the stress applied to the trailing arm without enlarging the cross section of the rear side frame.

The bracket reinforcement member may be a plate member having a substantially L-shaped cross section and having: a vertical stand wall that extends in the vehicle width direction and vertical direction; and an upper end bend flange that extends to be bent in the vehicle forward/rearward direction from an upper end part of the vertical stand wall, an outer flange that is fixed to an inner surface of the side sill in the vehicle width direction may be provided on an outer end part of the vertical stand wall in the vehicle width direction, an outer extension wall that is fixed to an upper wall which continues to an inner angle part of the side sill may be provided on an outer end part of the upper end bend flange in the vehicle width direction, and an inner extension wall that is fixed to an upper surface of an inner flange on an inside in the vehicle width direction of the rear side frame may be provided on an inner end part of the upper end bend flange in the vehicle width direction.

In this case, the bracket reinforcement member can be lowered from above to below an assembly body of the rear side frame and the side sill, the outer extension wall and the inner extension wall of the bracket reinforcement member can be placed on the upper surfaces of the upper wall of the side sill and the inner flange of the rear side frame, and in that state, the respective parts of the bracket reinforcement member can be easily joined to the side sill and the rear side frame through spot welding or the like. Further, it becomes possible to strongly support the stress in the vehicle width direction applied to the trailing arm via the bracket reinforcement member.

In a vehicle body rear part structure according to an aspect of the present invention, the bracket reinforcement member that reinforces the arm attachment bracket is directly or indirectly joined to the side sill and the cross member and is joined to the close plate. Therefore, when a stress in the vehicle width direction is applied to the trailing arm at the time of rapid turning of the vehicle or the like, it is possible to support the stress by the cross member and the side sill via the bracket reinforcement member, and when a stress in the vehicle forward/rearward direction is applied to the trailing arm, it is possible to support the stress by the close plate via the bracket reinforcement member. Accordingly, when the vehicle body rear part structure according to an aspect of the present invention is employed, it is possible to sufficiently support the stress in the vehicle width direction and the vehicle forward/rearward direction that is applied to the trailing arm at the time of rapid turning of the vehicle or the like.

DESCRIPTION OF EMBODIMENTS

Figure 1:
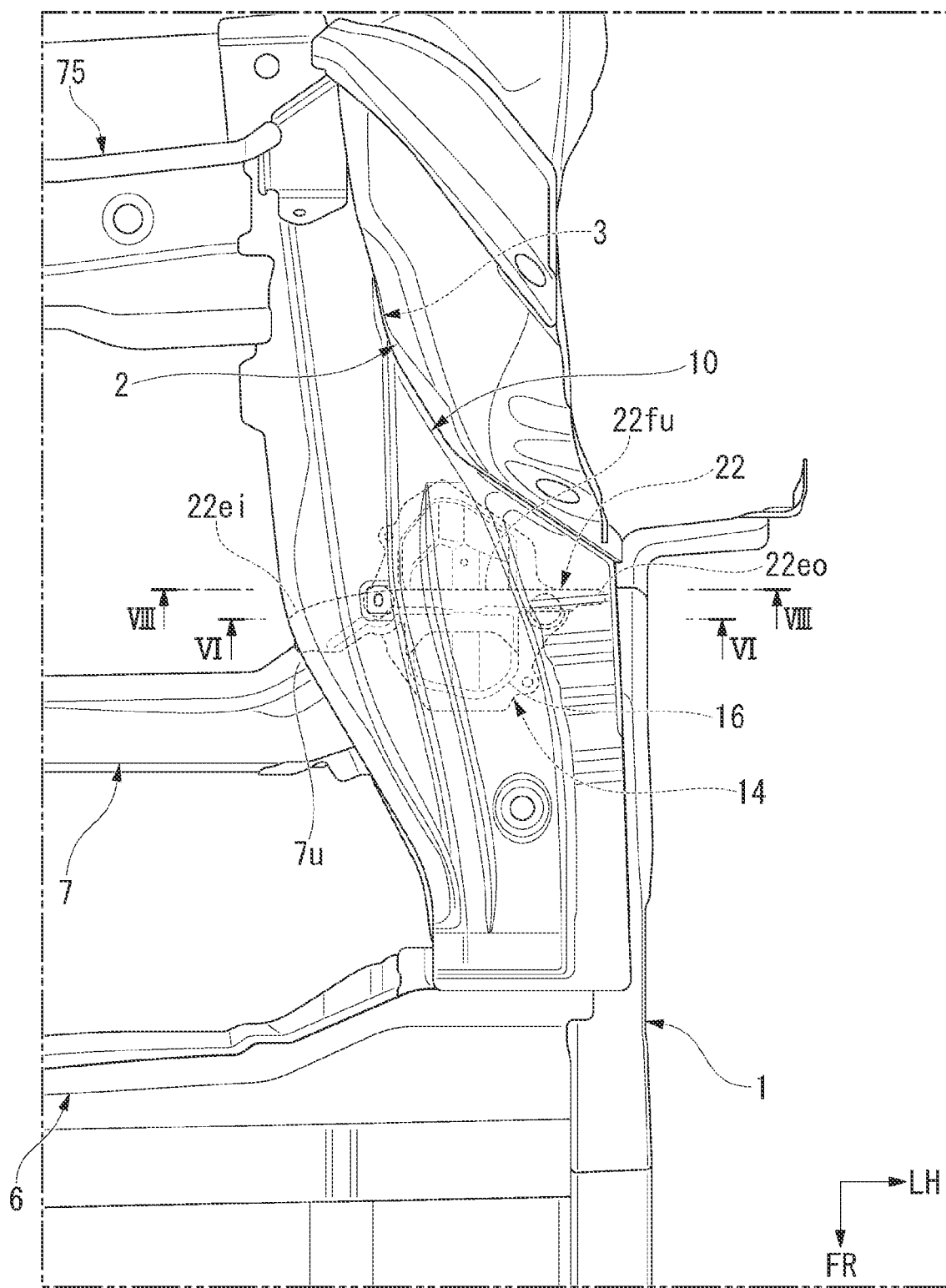
FIG. 1 is a plan view of a vehicle body rear part of an embodiment.

Hereinafter, an embodiment of the present invention will be described with reference to the drawings. Directions of forward, rearward, upward, downward, leftward, and rightward in the following description mean directions with respect to a direction in which a vehicle proceeds forward unless otherwise specified. In appropriate places in the drawings, an arrow FR that indicates a vehicle forward direction, an arrow UP that indicates a vehicle upward direction, and an arrow LH that indicates a vehicle leftward direction are shown.

Figure 2:
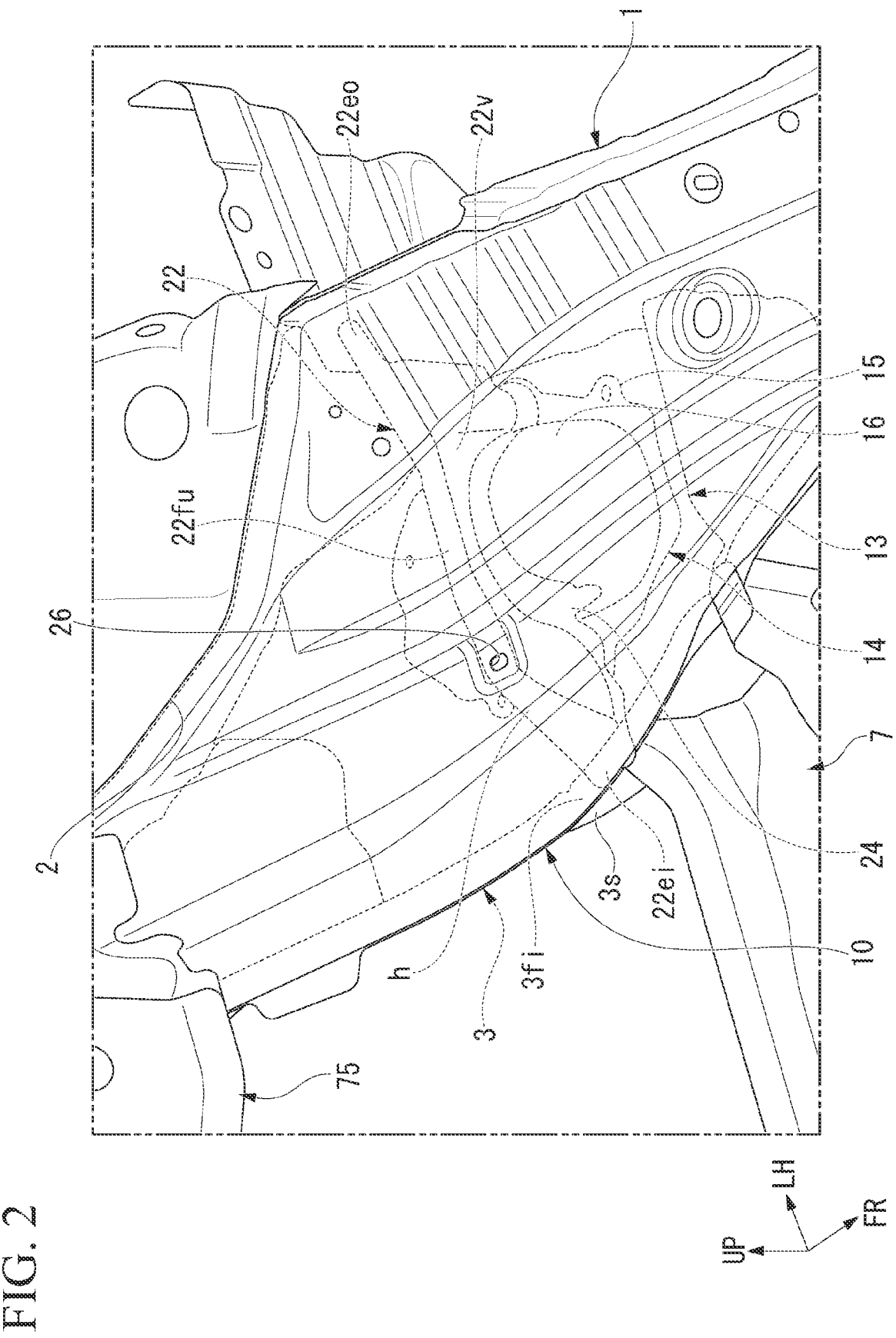
FIG. 2 is a perspective view of the vehicle body rear part of the embodiment.
Figure 3:
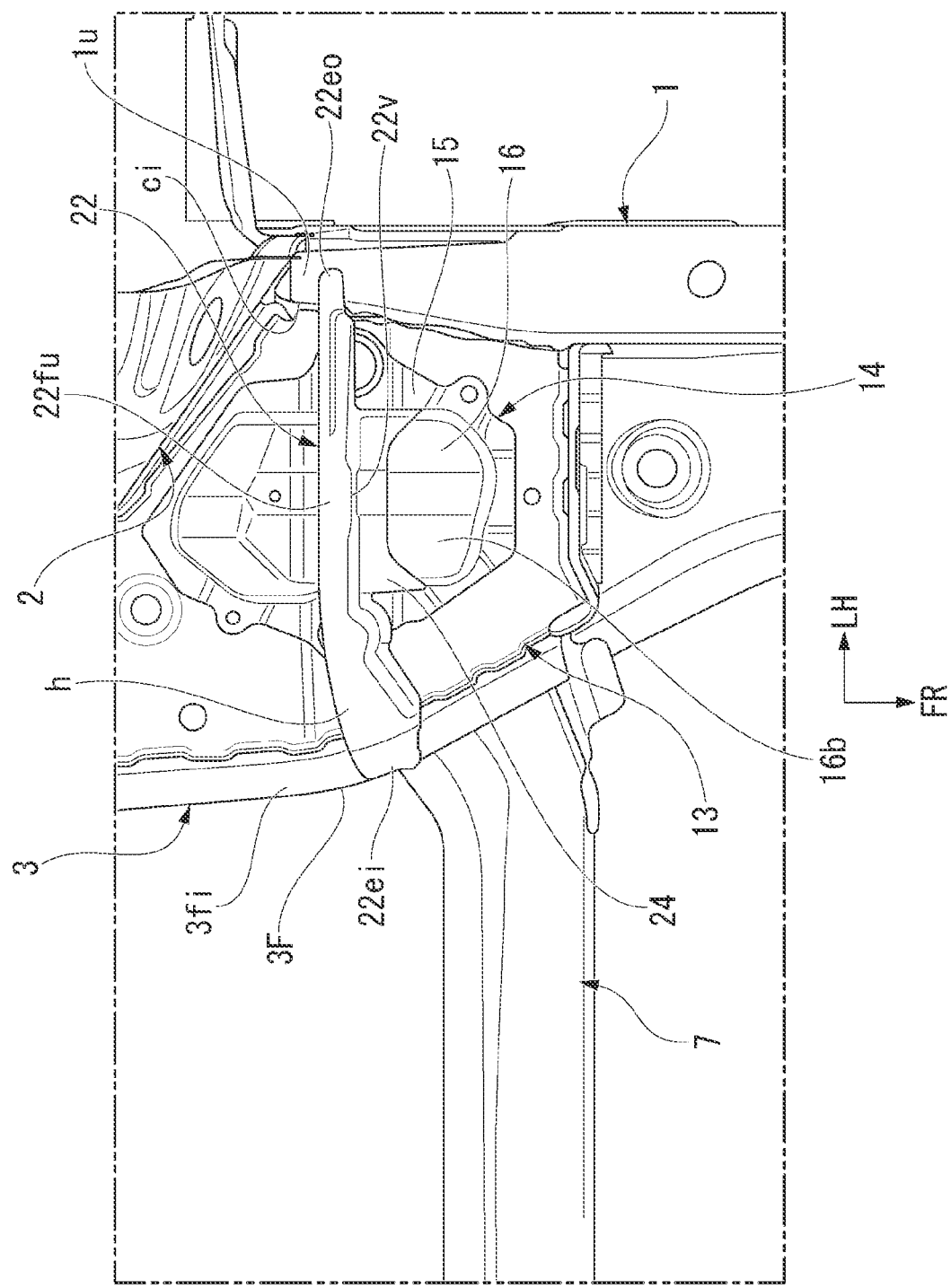
FIG. 3 is a plan view of the vehicle body rear part of the embodiment from which some components are removed.
Figure 4:
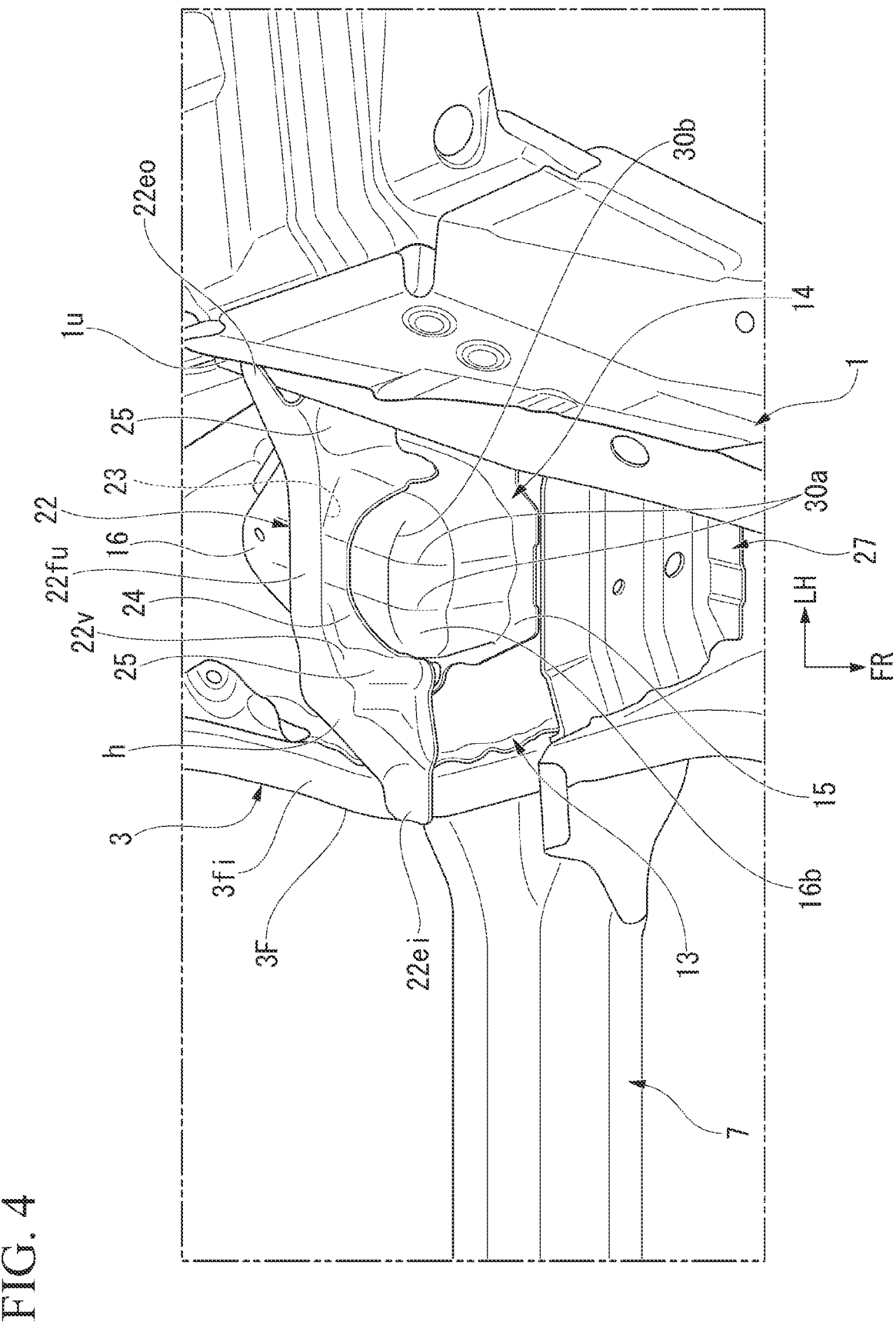
FIG. 4 is a perspective view of the vehicle body rear part of the embodiment from which some components are removed.
Figure 5:
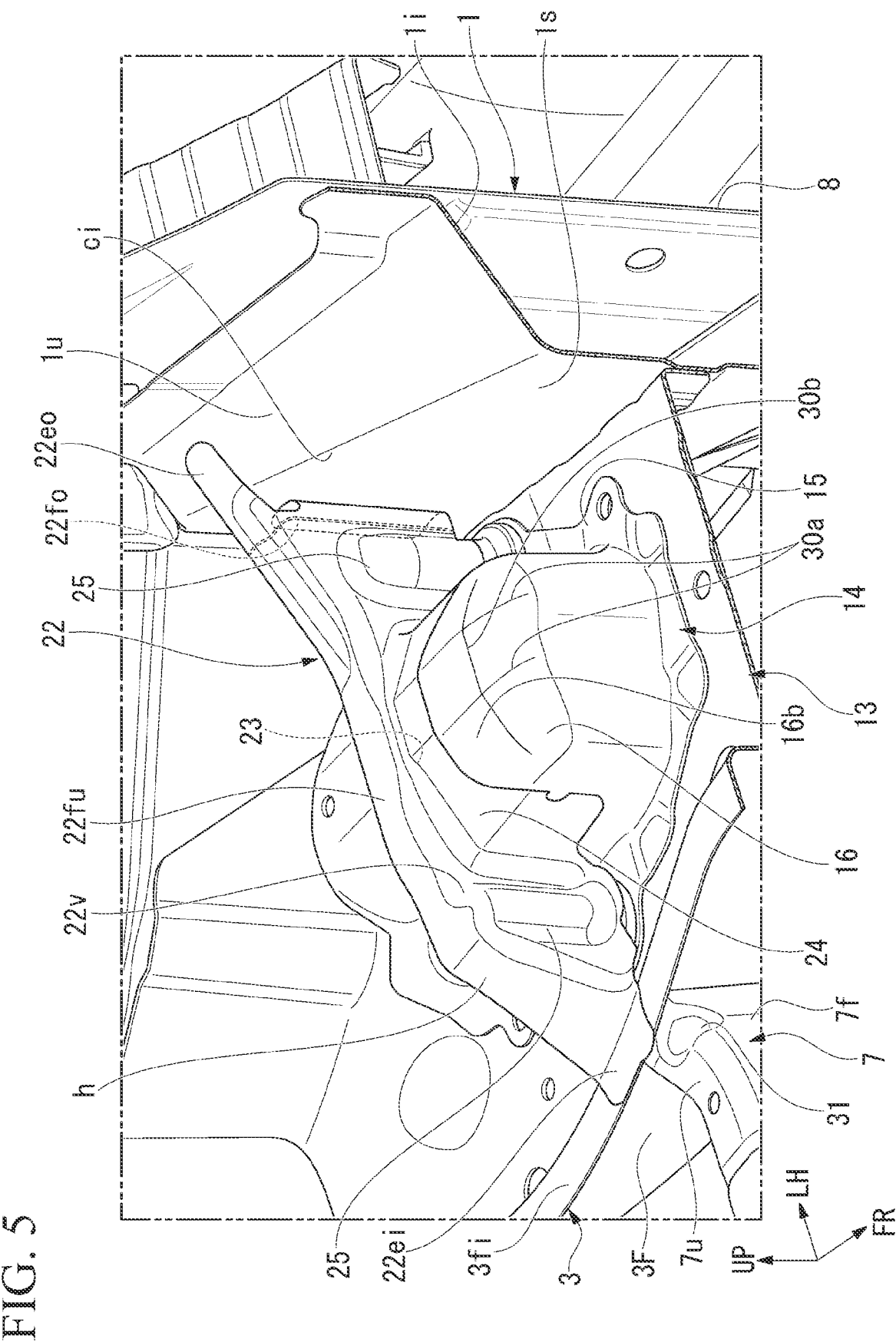
FIG. 5 is another perspective view of the vehicle body rear part of the embodiment from which some components are removed.

FIG. 1 is a plan view showing a left frame portion of a vehicle body rear part of a vehicle of the present embodiment. FIG. 2 is a perspective view showing the same left frame portion as in FIG. 1 when seen from a front right obliquely upper direction. FIG. 3 is a plan view of the same left frame portion as in FIG. 1 from which a part (a close plate 10) is removed. FIG. 4 and FIG. 5 are perspective views of the same left frame portion as in FIG. 1 from which a part (the close plate 10) is removed. FIG. 4 and FIG. 5 are views when the same left frame portion is seen from different angles.

A right frame portion of the vehicle body rear part is formed symmetrically to the left frame portion with a centerline of the vehicle in a width direction sandwiched therebetween. Therefore, hereinafter, only the left frame portion will be described, and description of the right frame portion will be omitted.

Reference numeral 1 in the drawings indicates a side sill disposed below a side part of a passenger compartment substantially in a vehicle forward/rearward direction. Reference numeral 2 indicates a rear wheel house (refer to FIG. 1 and FIG. 2) that covers the surrounding of an upper side of a rear wheel (not shown) behind the side sill 1. A rear side frame 3 that extends forward from a vehicle rear part is disposed inside the rear wheel house 2 in a vehicle width direction. A horizontal cross section of a front part of the rear wheel house 2 is formed to be curved to continuously cover the rear wheel from an inner end surface of the rear wheel in the vehicle width direction to a front surface side of the rear wheel. A main part of the rear side frame 3 is formed in a cross-sectional shape having a substantially C shape which opens to an upper side. The close plate 10 having almost the same shape as a shape in plan view of the rear side frame 3 is joined to an upper part of the rear side frame 3. The close plate 10 closes an opening on an upper side of the rear side frame 3.

A front region 3F of the rear side frame 3 is turned to the front side of the vehicle again after curving outside in the vehicle width direction along a curved shape of the front part of the rear wheel house 2 (a curved shape in a horizontal cross section), and is joined to an inner portion of the rear part of the side sill 1 in the vehicle width direction.

Figure 6:
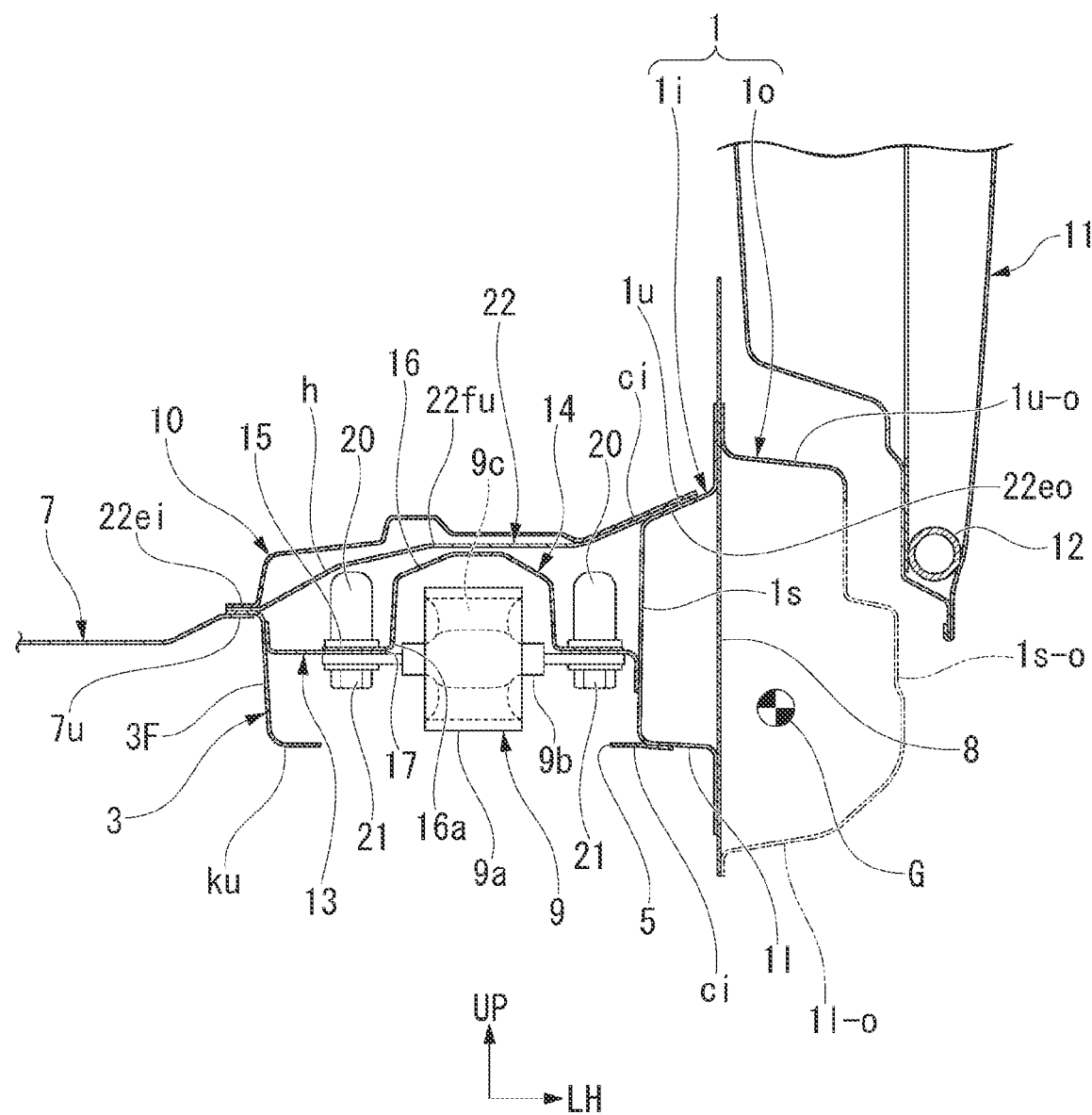
FIG. 6 is a cross-sectional view of the vehicle body rear part of the embodiment along a line VI-VI of FIG. 1.
Figure 7:
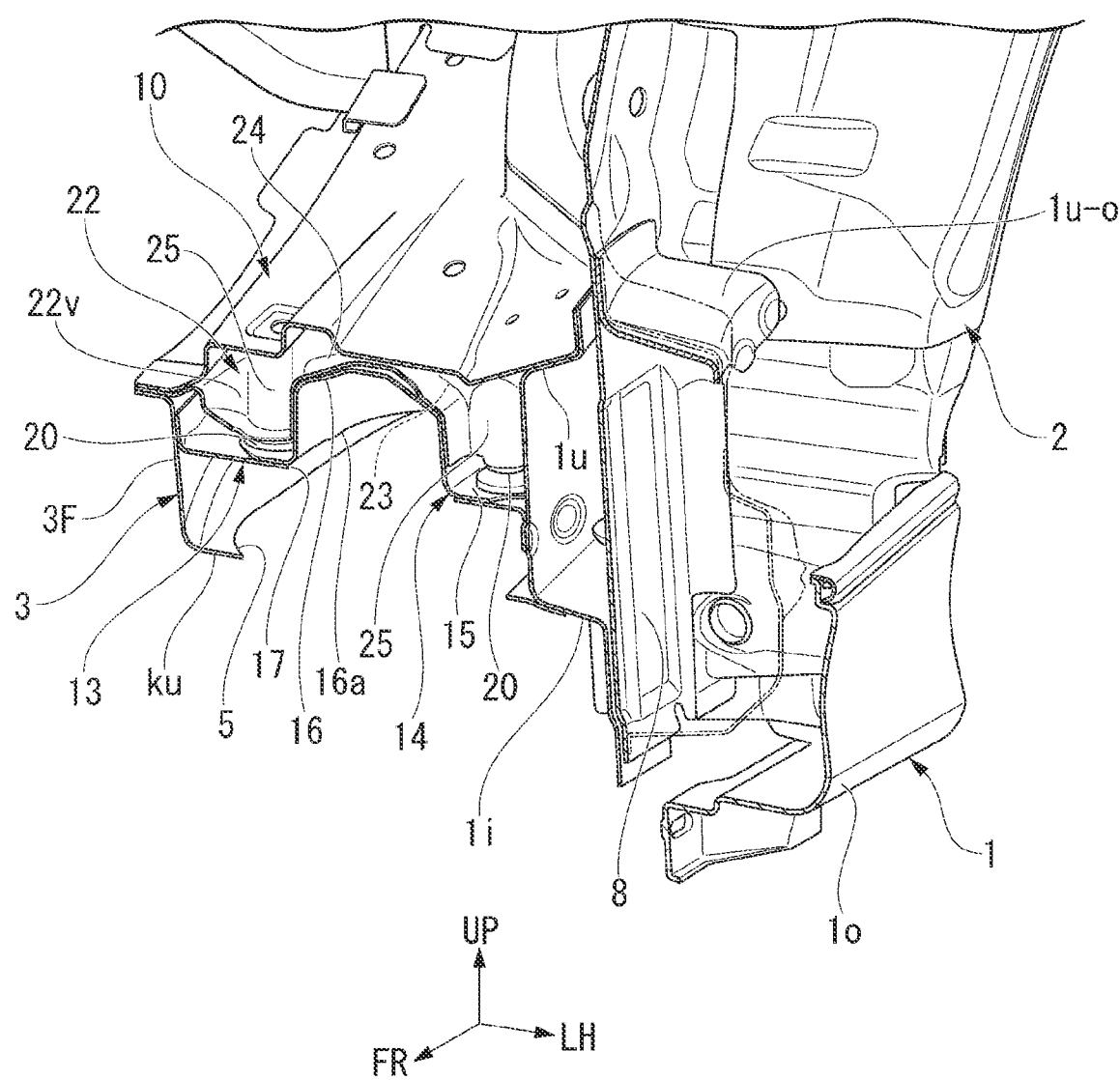
FIG. 7 is a partial cross-sectional perspective view of the vehicle body rear part of the embodiment, a portion of which is cut out along the line VI-VI of FIG. 1.
Figure 8:
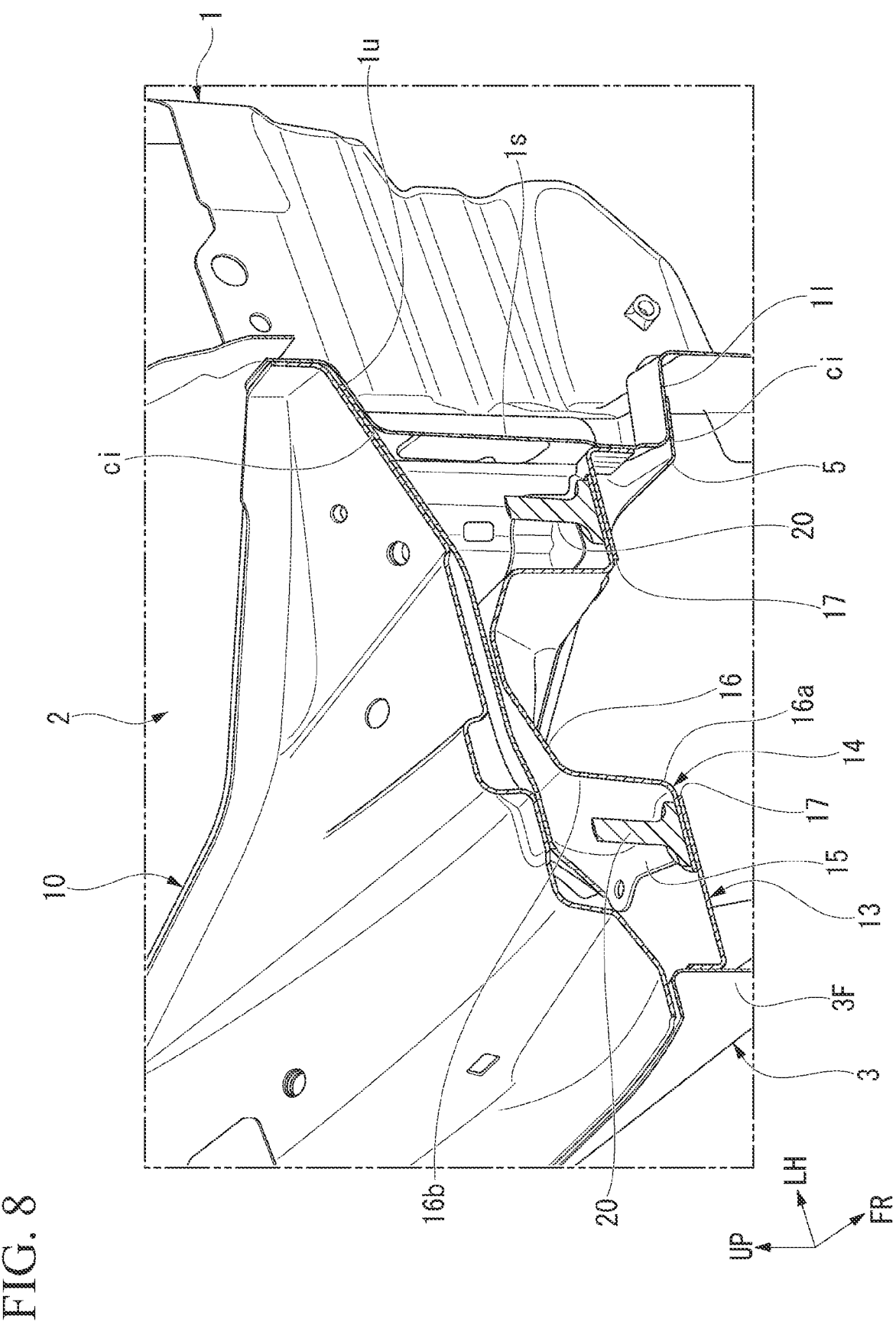
FIG. 8 is a partial cross-sectional perspective view of the vehicle body rear part of the embodiment, a portion of which is cut out along a line VIII-VIII of FIG. 1.
Figure 9:
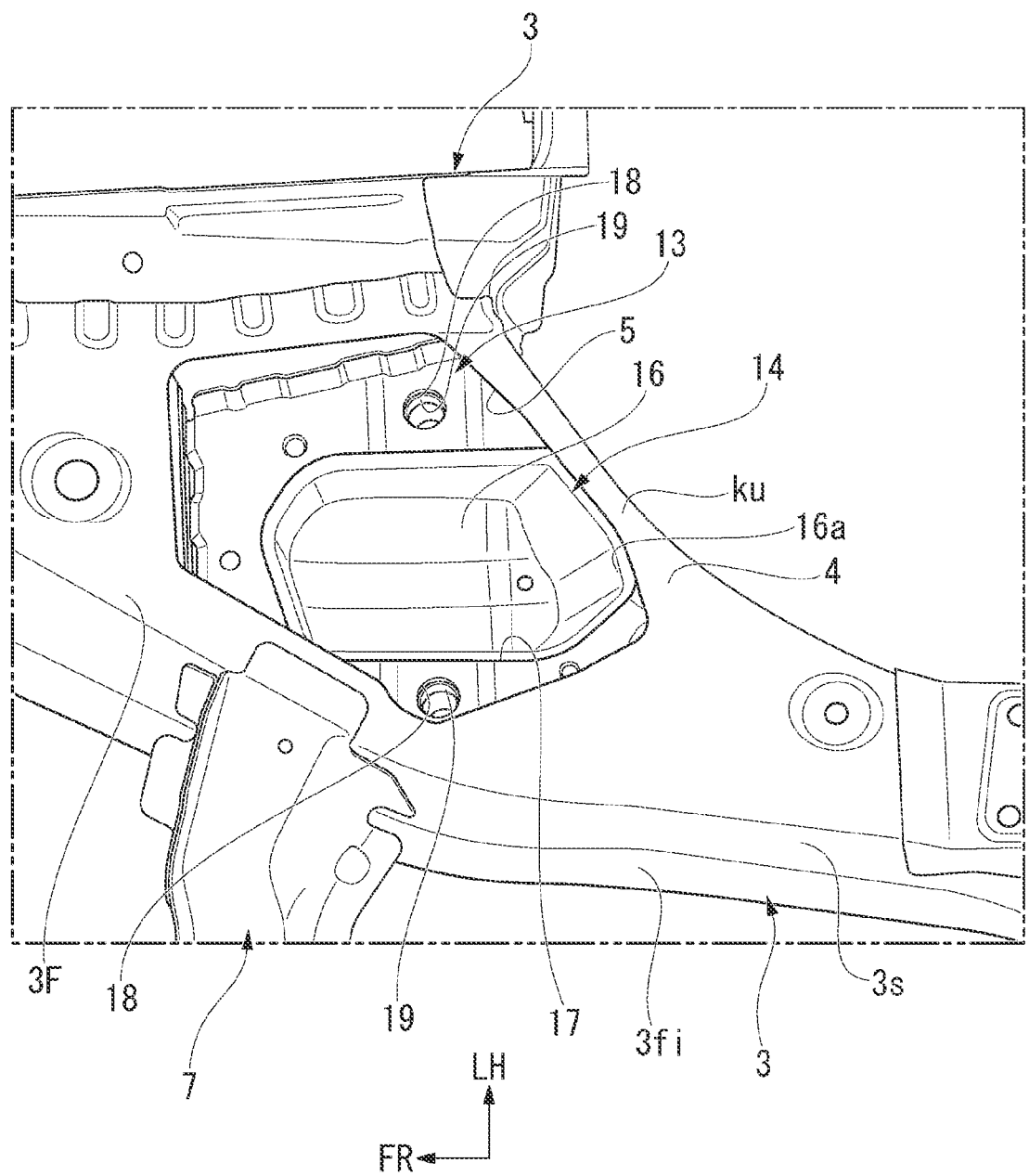
FIG. 9 is a view showing the vehicle body rear part of the embodiment when seen from below.

FIG. 6 is a cross-sectional view along a line VI-VI of FIG. 1. FIG. 7 is a partial cross-sectional perspective view of the left frame portion of the vehicle body rear part, a portion of which is cut out along the line VI-VI of FIG. 1. FIG. 8 is a partial cross-sectional perspective view of the left frame portion of the vehicle body rear part, a portion of which is cut out along a line VIII-VIII of FIG. 1. FIG. 9 is a view showing the left frame portion of the vehicle body rear part when seen from below.

A part of the front region 3F of the rear side frame 3 curved when seen in plan view is a kick-up part ku inclined upward as it goes toward a rear side of the vehicle. The rear side of the kick-up part ku of the rear side frame 3 extends substantially horizontally toward the rear side of the vehicle. As shown in FIG. 6, FIG. 7 and FIG. 9, an arm insertion hole 5 is formed on a lower wall 4 of the kick-up part ku. The vehicle of the present embodiment employs a trailing arm type rear wheel suspension apparatus. A trailing arm (not shown) of the rear wheel suspension apparatus supports the rear wheel at the rear end side, and the front end side is inserted into the arm insertion hole 5 of the kick-up part ku. As shown in FIG. 6, a front end part of the trailing arm is swingably supported in the cross section of the front region 3F (the kick-up part ku) of the rear side frame 3 via a mount member 9 having a cylindrical shape in which a rubber elastic body 9c is installed.

As shown in FIG. 1 and FIG. 2, a first cross member 6 that extends substantially in the vehicle width direction and that has both end parts connected to the right and left side sills 1 is disposed in front of a front end part of the rear side frame 3. The front regions 3F (the kick-up parts ku) of the right and left rear side frames 3 are connected to each other by a second cross member 7 (a cross member) that extends substantially in the vehicle width direction. Rear regions of the right and left rear side frames 3 are connected to each other by a third cross member 75 that extends substantially in the vehicle width direction.

As shown in FIG. 6 and FIG. 7, in the side sill 1, an inner side sill 1i and an outer side sill 1o that have a substantially hat shape and that include upper and lower joint flanges are joined to each other by the upper and lower joint flanges.

A stiffener 8 that crosses the cross section formed of the inner side sill 1i and the outer side sill 1o is interposed between the joint flanges of the inner side sill 1i and the outer side sill 1o.

In the inner side sill 1i, an inner angle part ci is disposed at upper and lower positions of a side wall 1s. An upper wall 1u of the inner side sill 1i extends outward in the vehicle width direction from the inner angle part ci on the upper side. A lower wall 1l of the inner side sill 1i extends outward in the vehicle width direction from the inner angle part ci on the lower side.

The outer side sill 1o includes an upper wall 1u-o that is inclined slightly downward and extends outward in the vehicle width direction from the joint flange on the upper end side. An outer side wall 1s-o in the vehicle width direction and a lower wall 1l-o are continuously provided on an outer end part of the upper wall 1u-o in the vehicle width direction. However, in a cross-sectional part shown in FIG. 6 and FIG. 7, the side wall 1s-o and the lower wall 1l-o are partially cut out. Reference numeral G in FIG. 6 indicates a center of gravity of the side sill 1.

A lower edge part of a side door 1l on the rear side is disposed on an outer side of the side sill 1 in the vehicle width direction to partially overlap the side sill 1. A door beam 12 is installed in the lower edge part of the side door 1l. The door beam 12 is a pipe member made of metal that extends substantially horizontally in the vehicle forward/rearward direction. The door beam 12 receives an impact load while minimizing excessive deformation of a panel member of the side door 1l when the impact load is input to the side door 1l from an outer side in the vehicle width direction. The door beam 12 is disposed at a position of the lower edge part of the side door 1l above the center of gravity G of the side sill 1 that overlaps the upper region of the outer side sill 1o.

A bracket support plate 13 made of metal that extends in the vehicle forward/rearward direction and the vehicle width direction is fixed into the cross section of the kick-up part ku of the front region 3F of the rear side frame 3. An arm attachment bracket 14 made of metal that supports the mount member 9 is fixed to an upper surface of the bracket support plate 13. The arm attachment bracket 14 has a flat base part 15 that is joined to the bracket support plate 13, and a dome-shaped part 16 that bulges to be curved upward from a center region of the base part 15. As shown in FIG. 9, a communication port 17 that causes an opening 16a facing downward of the dome-shaped part 16 of the arm attachment bracket 14 to communicate with the arm insertion hole 5 of the rear side frame 3 is provided on the bracket support plate 13. Bolt insertion holes 18 and 19 (refer to FIG. 9) that penetrate in the upward/downward direction are formed at corresponding positions of right and left side edge parts of the communication port 17 of the bracket support plate 13 and the base part 15 of the arm attachment bracket 14. A fixation nut 20 (a collar nut) is attached to upper surfaces of right and left edge portions of the base part 15 of the arm attachment bracket 14 through welding or the like.

Here, as shown in FIG. 6, the mount member 9 has a shaft part 9b disposed at an axis center position of a cylinder part 9a, and the cylinder part 9a and the shaft part 9b are connected by the rubber elastic body 9c. Both end portions of the shaft part 9b that penetrates through the cylinder part 9a are fixed to the arm attachment bracket 14 by a bolt 21. More specifically, both end portions of the shaft part 9b of the mount member 9 are formed to be flat, and a bolt insertion hole (not shown) is formed on the flat portion. Then, a shaft part of the bolt 21 passes through bolt insertion holes of the shaft part 9b, the bracket support plate 13, and the arm attachment bracket 14 and is fastened to the corresponding fixation nut 20 of an upper part of the arm attachment bracket 14. Accordingly, the mount member 9 is fixed into the cross section of the front region 3F of the rear side frame 3.

As shown in FIG. 3 to FIG. 5, a bracket reinforcement member 22 is integrally attached to an upper surface side of the arm attachment bracket 14. The bracket reinforcement member 22 is formed by a plate member made of metal. The bracket reinforcement member 22 is a plate member that has a substantially L-shaped cross section and that includes: a vertical stand wall 22v having a substantially right triangle shape having an oblique side h inclined downward from an outer side to an inner side in the vehicle width direction when seen in a front view; and an upper end bend flange 22fu that extends from an upper end part of the vertical stand wall 22v to be bent at a substantially right angle to the vehicle rear side. The bracket reinforcement member 22 is fixed to the arm attachment bracket 14 such that a longitudinal direction of the vertical stand wall 22v is oriented in the vehicle width direction.

As shown in FIG. 5, an outer flange 22fo curved at a substantially right angle to the vehicle rear side and fixed to the side wall is of the inner side sill 1i of the side sill 1 (an inner surface of the side sill 1 in the vehicle width direction) is provided to extend on an outer end part of the vertical stand wall 22v of the bracket reinforcement member 22 in the vehicle width direction. An outer extension wall 22eo joined to an upper surface of the upper wall 1u of the inner side sill 1i of the side sill 1 is provided to extend on an outer end part of the upper end bend flange 22fu of the bracket reinforcement member 22 in the vehicle width direction.

The front region 3F of the rear side frame 3 includes an inner flange 3fi that extends inward in the vehicle width direction and that is provided on an upper end part of an inner side wall in the vehicle width direction that constitutes an upward C-shaped cross section. An inner extension wall 22ei that is joined to an upper surface of the inner flange 3fi of the rear side frame 3 is provided to extend on an inner end part of the upper end bend flange 22fu of the bracket reinforcement member 22 in the vehicle width direction. A front flange part 7u (an upper wall) on the outer side in the vehicle width direction of the second cross member 7 overlaps a lower surface of the inner flange 3fi of the rear side frame 3. The front flange part 7u of the second cross member 7, the inner flange 3fi of the rear side frame 3, and the inner extension wall 22ei of the bracket reinforcement member 22 are fixed through welding in a state of three layers.

The bracket reinforcement member 22 has an outer end part in the vehicle width direction that is joined to the vicinity (the upper wall 1u) of the inner angle part ci above the side sill 1 by the outer extension wall 22eo of the upper end bend flange 22fu. The bracket reinforcement member 22 has an inner end part in the vehicle width direction that is joined to the inner flange 3fi of the rear side frame 3 and an outer end part of the second cross member 7 in the vehicle width direction by the inner extension wall 22ei of the upper end bend flange 22fu.

As shown in FIG. 6, the bracket reinforcement member 22 is disposed above the center of gravity G of the side sill 1 in this state.

The vertical stand wall 22v of the bracket reinforcement member 22 includes a recess part 23 that is fitted to an outer surface 16b of the dome-shaped part 16 of the arm attachment bracket 14. The recess part 23 is formed to be recessed upward in a substantially arc shape from a lower edge of a substantially middle part of the vertical stand wall 22v in the vehicle width direction. A lower side bend flange 24 that is joined to the outer surface 16b of the dome-shaped part 16 is formed on an edge portion of the recess part 23. The lower side bend flange 24 is bent toward a vehicle front side along the outer surface 16b of the dome-shaped part 16. The lower side bend flange 24 overlaps the outer surface 16b of the dome-shaped part 16 and is fixed to the outer surface 16b through welding or the like.

As shown in FIG. 4 and FIG. 5, a longitudinal ridge line 30a in the vehicle forward/rearward direction and a lateral ridge line 30b in the vehicle width direction are provided on the dome-shaped part 16. The dome-shaped part 16 has rigidity that is enhanced by the longitudinal ridge line 30a and the lateral ridge line 30b. Only one of the longitudinal ridge line 30a and the lateral ridge line 30b may be provided, and the number of each of the ridge lines 30a and 30b is arbitrary.

A nut reception part 25 having an arc-shaped cross section that extends in the upward/downward direction is provided on both right and left side portions of the recess part 23 in the vertical stand wall 22v of the bracket reinforcement member 22. An outer surface of the fixation nut 20 that is attached to an upper surface of the arm attachment bracket 14 is integrally fixed to the nut reception part 25 through welding or the like.

The close plate 10 that closes the rear side frame 3 from above is fixed to an upper part of the bracket reinforcement member 22 that is fixed into the cross section of the front region 3F of the rear side frame 3 together with the arm attachment bracket 14. Specifically, the close plate 10 overlaps a part of the upper surface of the upper end bend flange 22fu of the bracket reinforcement member 22, and the overlapping parts are joined through welding.

With respect to the joint of the close plate 10 and the upper end bend flange 22fu, for example, as shown in FIG. 2, a penetration hole 26 is formed in a part of the close plate 10 to be overlapped with the upper surface of the upper end bend flange 22fu, and a circumferential edge part of the penetration hole 26 and an upper surface of the upper end bend flange 22fu can be fixed through the penetration hole 26 through MIG welding or the like. As a result, the upper end bend flange 22fu of the bracket reinforcement member 22 is joined to the close plate 10 via the welding member.

The close plate 10 that closes the rear side frame 3 from above has an inner edge part in the vehicle width direction that is joined to the inner flange 3fi of the rear side frame 3. The close plate 10 that closes the rear side frame 3 from above has an outer edge part in the vehicle width direction that is joined to an outer flange (not shown) of the rear side frame 3 and the upper wall 1u of the inner side sill 1i. As shown in FIG. 1, a front edge part of the close plate 10 is joined to the upper surface of the first cross member 6 that connects the right and left side sills 1 in front of the rear side frame 3.

As shown in FIG. 6, an outer upper end part of the bracket reinforcement member 22 in the vehicle width direction that is disposed in the cross section of the front region 3F of the rear side frame 3 faces the upper wall 1u-o of the outer side sill 1o with the stiffener 8 of the side sill 1 sandwiched therebetween. The upper wall 1u-o of the outer side sill 1o is inclined slightly downward toward the outer side in the vehicle width direction as described above, and an outer end part in the vehicle width direction faces the door beam 12 in the side door 11.

In the present embodiment, the upper wall 1u-o disposed to be inclined downward toward the outside in the vehicle width direction constitutes a load transmission part in the cross section of the side sill 1 that transmits an impact load to the bracket reinforcement member 22 when the impact load is input to the door beam 12 from the outside in the vehicle width direction.

As shown in FIG. 4, a bulkhead 27 that extends downward from a front edge part of the bracket support plate 13 that is fixed into the cross section of the front region 3F of the rear side frame 3 is joined to the front edge part. The bulkhead 27 extends in the vehicle width direction and the upward/downward direction in the cross section of the front region 3F of the rear side frame 3 and is joined to the cross section of the front region 3F of the rear side frame 3 and the side wall of the side sill 1. The bulkhead 27 reinforces the cross section of the front region 3F in the front region 3F of the rear side frame 3 and rigidly joins the lower side of the front region 3F to the side surface of the side sill 1.

Figure 10:
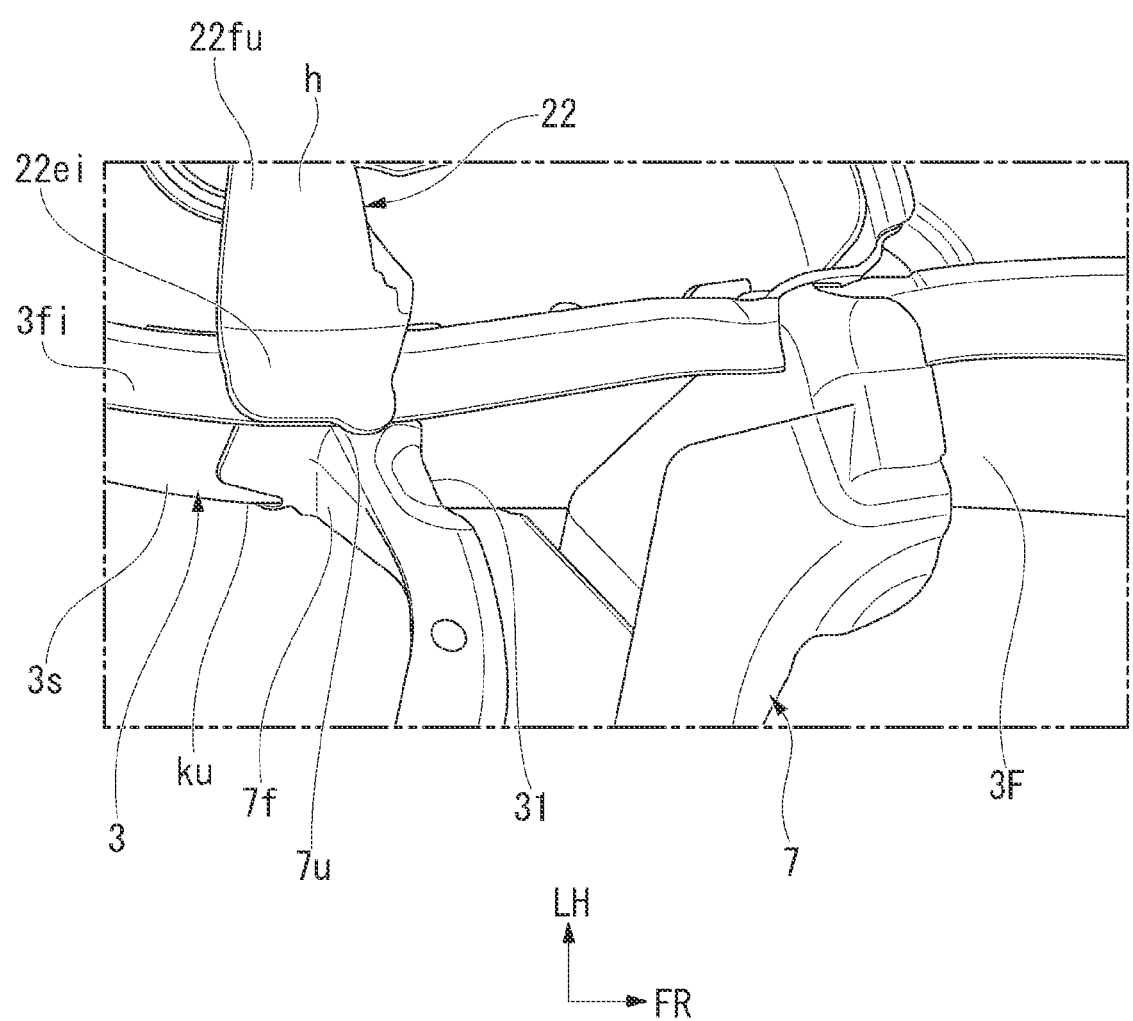
FIG. 10 is a perspective view showing a joint part between a second cross member and a rear side frame of the vehicle body rear part of the embodiment when seen from an upper side.

FIG. 10 is a perspective view showing a joint part between the second cross member 7 and the rear side frame 3 when seen from above.

As shown in FIG. 10, the second cross member 7 is formed in a substantially hat shape in a cross section that opens upward. In the outer end region of the second cross member 7 in the vehicle width direction, a front wall 7$f$ and the front flange part 7$u$ that extends to be bent forward from the upper end part of the front wall 7$f$ extend to be slightly curved toward the outside in the vehicle width direction. Outer end portions of the front wall 7$f$ and the front flange part 7$u$ in the vehicle width direction butt against an inner side wall 3$s$ of the curved rear side frame 3 in the vehicle width direction in a state of being perpendicular to the side wall 3$s$. The front wall 7$f$ and the front flange part 7$u$ are fixed to an inner surface of the side wall 3$s$ of the rear side frame 3 in the vehicle width direction and a lower surface of the inner flange 3$fi$ through welding. As described above, the front flange part 7$u$ is fixed to the inner flange 3$fi$ of the rear side frame 3 and the inner extension wall 22$ei$ of the bracket reinforcement member 22 in a state of three layers through welding.

A depression part 31 is formed in the vicinity of outer end parts of the front flange part 7$u$ and the front wall 7$f$ of the second cross member 7 in the vehicle width direction to cross the front wall 7$f$ and the front flange part 7$u$. The depression part 31 is a weak part (a fragile part) with respect to an input load in an extension direction of the second cross member 7 and induces a buckling distortion of the second cross member 7 when an impact load in the extension direction is input to the second cross member 7.

Figure 11:
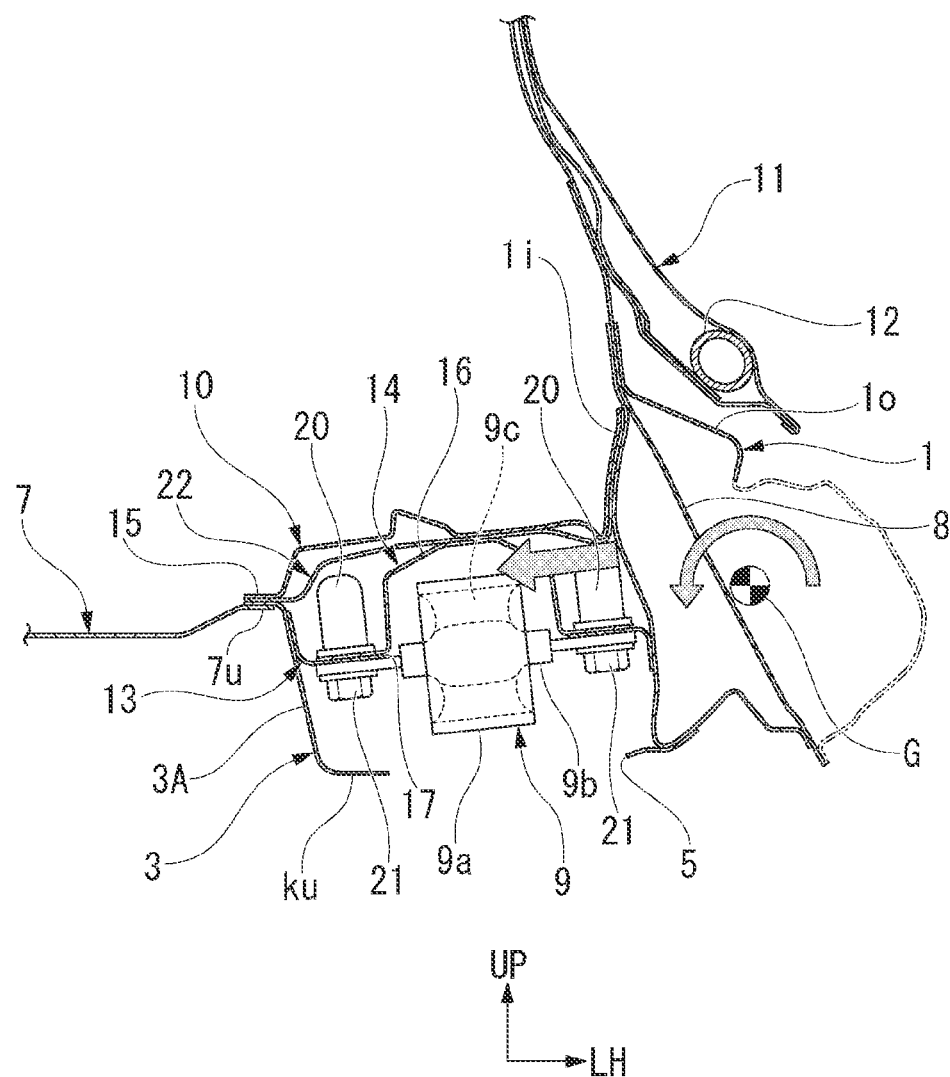
FIG. 11 is a cross-sectional view like FIG. 6 showing a deformation behavior upon input of an impact load to the vehicle body rear part of the embodiment.

FIG. 11 is a cross-sectional view like FIG. 6 showing a deformation behavior of the vehicle body rear part when an impact load directed toward an inner side in the vehicle width direction is input to an outer side of the rear side door 11.

As shown in FIG. 11, when the impact load directed toward the inner side in the vehicle width direction is input to the outer side of the side door 11, the impact load is transmitted to the side sill 1 from the door beam 12 in the side door 11 and is further transmitted to the second cross member 7 through the bracket reinforcement member 22 that crosses the front region 3F of the rear side frame 3 in the vehicle width direction from the side sill 1. Therefore, the impact load input to the side door 11 is efficiently transmitted to the second cross member 7 through the bracket reinforcement member 22.

Since the door beam 12 in the side door 11 is shifted upward from the center of gravity G of the side sill 1, the impact load that is input to the side sill 1 from the door beam 12 applies a moment shown by an arrow in FIG. 11 to surroundings of the axis center (the center of gravity G) of the side sill 1. However, in the vehicle body rear part structure of the present embodiment, since the inner angle part $ci$ above the center of gravity G of the side sill 1 is connected to the outer end part of the second cross member 7 in the vehicle width direction via the bracket reinforcement member 22, the moment can be efficiently received by the bracket reinforcement member 22. As a result, it is possible to prevent the upper part of the side door 11 from collapsing into the vehicle inside.

When a stress in the vehicle width direction is applied to the trailing arm at the time of rapid turning of the vehicle or the like, the stress is strongly supported by the fixation nut 20 of the arm attachment bracket 14 that fastens and fixes the mount member 9, the second cross member 7, and the side sill 1 via the bracket reinforcement member 22.

Further, when a stress in the vehicle forward/rearward direction is applied to the trailing arm at the time of rapid turning of the vehicle or the like, the stress is supported by the fixation nut 20 of the arm attachment bracket 14 that fastens and fixes the mount member 9 and the close plate 10 via the bracket reinforcement member 22. The close plate 10 is joined to an upper part of the rear side frame 3 and constitutes a large closed cross section elongated in the forward/rearward direction together with the rear side frame 3. Therefore, the stress in the vehicle forward/rearward direction applied to the trailing arm is strongly fixed by the close plate 10.

<Advantage of Embodiment>

As described above, in the vehicle body rear part structure of the present embodiment, the end parts on both sides in the vehicle width direction of the bracket reinforcement member 22 that reinforces the arm attachment bracket 14 are joined to the side sill 1 and the second cross member 7, and the upper part of the bracket reinforcement member 22 is joined to the close plate 10. Therefore, when a stress in the vehicle width direction is applied to the trailing arm at the time of rapid turning of the vehicle or the like, it is possible to strongly support the stress by the second cross member 7 and the side sill 1 via the bracket reinforcement member 22. Further, when a stress in the vehicle direction is applied to the trailing arm at the time of rapid turning of the vehicle or the like, it is possible to strongly support the stress by the close plate 10 via the bracket reinforcement member 22.

Accordingly, when the vehicle body rear part structure of the present embodiment is employed, it is possible to sufficiently support the stress in the vehicle width direction and the vehicle forward/rearward direction that is applied to the trailing arm at the time of rapid turning of the vehicle or the like.

Further, in the vehicle body rear part structure of the present embodiment, the bracket reinforcement member 22 is constituted of a plate member having a substantially L-shaped cross section and having the vertical stand wall 22$v$ and the upper end bend flange 22$fu$, and the circumference edge part of the penetration hole 26 of the close plate 10 is joined to the upper end bend flange 22$fu$ via a weld material. In the case of the present configuration, through the penetration hole 26 of the close plate 10, it is possible to easily weld and fix the upper end bend flange 22$fu$ and the circumference edge part of the penetration hole 26 through MIG welding or the like. Accordingly, it is possible to strongly fix the close plate 10 and the upper end bend flange 22$fu$ of the bracket reinforcement member 22 and to sufficiently support the stress in the vehicle forward/rearward direction applied to the trailing arm by the close plate 10.

Further, in the vehicle body rear part structure of the present embodiment, the dome-shaped part 16 that covers the upper side of the mount member 9 is formed on the arm attachment bracket 14, the recess part 23 that is fitted to the outer surface of the dome-shaped part 16 is formed on the vertical stand wall 22$v$ of the bracket reinforcement member 22, and the lower side bend flange 24 that is joined to the outer surface of the dome-shaped part 16 is formed on the edge portion of the recess part 23. Therefore, a stress applied to the arm attachment bracket 14 from the mount member 9 can be efficiently transmitted to the bracket reinforcement member 22 through the dome-shaped part 16 of the arm attachment bracket 14, the lower side bend flange 24, and the recess part 23 of the bracket reinforcement member 22.

Accordingly, when the present configuration is employed, it is possible to sufficiently support the stress applied to the trailing arm without enlarging the cross section of the rear side frame 3.

Further, the vehicle body rear part structure of the present embodiment is constituted of the plate member having a substantially L-shaped cross section and having: the vertical stand wall 22v having a substantially right triangle shape having the oblique side h inclined downward from the outer side to the inner side in the vehicle width direction when seen in a front view; and the upper end bend flange 22fu that extends to be bent in the vehicle forward/rearward direction from the upper end part of the vertical stand wall 22v. The outer flange 22fo that is fixed to the inner surface of the side sill 1 is provided on the outer end part of the vertical stand wall 22v in the vehicle width direction, the outer extension wall 22eo that is fixed to the upper wall 1u of the side sill 1 is provided on the outer end part of the upper end bend flange 22fu in the vehicle width direction, and the inner extension wall 22ei that is fixed to the upper surface of the inner flange 3fi of the rear side frame 3 is provided on the inner end part of the upper end bend flange 22fu in the vehicle width direction.

Therefore, the bracket reinforcement member 22 can be lowered from above to below the assembly body of the rear side frame 3 and the side sill 1, the outer extension wall 22eo and the inner extension wall 22ei of the bracket reinforcement member 22 can be placed on the upper surfaces of the upper wall 1u of the side sill 1 and the inner flange 3fi of the rear side frame 3, and in that state, the respective parts of the bracket reinforcement member 22 can be easily joined to the side sill 1 and the rear side frame 3 through spot welding or the like.

Further, when the present configuration is employed, it is possible to support the stress in the vehicle width stress direction applied to the trailing arm by the side sill 1 and the second cross member 7 via the bracket reinforcement member 22 having a strong fixation structure.

The present invention is not limited to the embodiment described above, and various design changes can be made without departing from the scope of the present invention.

For example, the above embodiment is described using an example in which the outer end part of the bracket reinforcement member 22 in the vehicle width direction is directly joined to the vicinity of the inner angle part ci above the side sill 1; however, the outer end part of the bracket reinforcement member 22 in the vehicle width direction may be indirectly joined to the vicinity of the inner angle part ci above the side sill 1 via a separate member. Further, the above embodiment is described using an example in which the inner end part of the bracket reinforcement member 22 in the vehicle width direction is indirectly joined to the outer end part of the second cross member 7 (cross member) in the vehicle width direction via the inner flange 3fi of the rear side frame 3; however, the inner end part of the bracket reinforcement member 22 in the vehicle width direction may be directly joined to the outer end part of the second cross member 7 (cross member) in the vehicle width direction.

What is claimed is:

1. A vehicle body rear part structure, comprising:
a side sill that is disposed below a side part of a passenger compartment substantially in a vehicle forward/rearward direction;
a rear side frame which has a front region that is joined to an inside in a vehicle width direction of a rear part of the side sill and in which an arm insertion hole is provided on a lower wall of the front region;
a cross member that extends substantially in the vehicle width direction and that has an outer end part in the vehicle width direction which is connected to the front region of the rear side frame;
a trailing arm which has a rear side that supports a rear wheel and in which a front end part that is inserted through the arm insertion hole of the rear side frame is swingably supported via a mount member at the front region of the rear side frame;
an arm attachment bracket that is fixed into a cross section having a substantially C shape which opens to an upper side of the front region of the rear side frame and that has a fixation nut with which the mount member is fastened and fixed;
a bracket reinforcement member that is attached to the arm attachment bracket and that reinforces the arm attachment bracket; and
a close plate that is fixed to an upper part of the front region of the rear side frame and that closes an opening on an upper side of the front region,
wherein end parts on both sides in the vehicle width direction of the bracket reinforcement member are directly or indirectly joined to the side sill and the cross member, and an upper part of the bracket reinforcement member is directly overlapped by and joined to the close plate.

2. The vehicle body rear part structure according to claim 1,
wherein the bracket reinforcement member is a plate member having a substantially L-shaped cross section and having: a vertical stand wall that extends in the vehicle width direction and vertical direction; and an upper end bend flange that extends to be bent in the vehicle forward/rearward direction from an upper end part of the vertical stand wall,
a penetration hole is provided on the close plate, and
a circumference edge part of the penetration hole of the close plate is joined to the upper end bend flange via a weld material.

3. The vehicle body rear part structure according to claim 2,
wherein the arm attachment bracket includes a dome-shaped part that covers an upper side of the mount member,
the vertical stand wall includes a recess part that is fitted to an outer surface of the dome-shaped part, and
a lower side bend flange that is joined to the outer surface of the dome-shaped part is formed on an edge portion of the recess part.

4. The vehicle body rear part structure according to claim 1,
wherein the bracket reinforcement member is a plate member having a substantially L-shaped cross section and having: a vertical stand wall that extends in the vehicle width direction and vertical direction; and an upper end bend flange that extends to be bent in the vehicle forward/rearward direction from an upper end part of the vertical stand wall, an outer flange that is fixed to an inner surface of the side sill in the vehicle width direction is provided on an outer end part of the vertical stand wall in the vehicle width direction, an outer extension wall that is fixed to an upper wall which continues to an inner angle part of the side sill is provided on an outer end part of the upper end bend flange in the vehicle width direction, and an inner extension wall that is fixed to an upper surface of an inner flange on an inside in the vehicle width direction of the rear side frame is provided on an inner end part of the upper end bend flange in the vehicle width direction.

\* \* \* \* \*